United States Patent
Khalil et al.

(10) Patent No.: US 7,434,653 B2
(45) Date of Patent: Oct. 14, 2008

(54) ON-DEMAND ELECTRO-HYDRAULIC STEERING SYSTEM

(75) Inventors: Rabie E. Khalil, Dunlap, IL (US); Xiaodong Huang, Peoria, IL (US); Michael J. Mientus, Metamora, IL (US); John James Krone, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 591 days.

(21) Appl. No.: 11/094,291

(22) Filed: Mar. 31, 2005

(65) Prior Publication Data

US 2006/0219466 A1 Oct. 5, 2006

(51) Int. Cl.
*B62D 5/06* (2006.01)

(52) U.S. Cl. .................. 180/418; 180/419; 180/420; 180/421; 180/422; 180/423; 137/625.64; 137/625.23; 137/625.43

(58) Field of Classification Search ......... 180/418–423; 137/625.64, 625.43, 625.23
See application file for complete search history.

(56) References Cited

U.S. PATENT DOCUMENTS

| | | | | |
|---|---|---|---|---|
| 4,476,529 A | * | 10/1984 | Nakamura et al. | 701/41 |
| 4,751,977 A | * | 6/1988 | Cordiano | 180/442 |
| 5,048,630 A | | 9/1991 | Schaffer | |
| 5,122,958 A | * | 6/1992 | Eto et al. | 701/41 |
| 5,193,637 A | * | 3/1993 | Lindblom | 180/420 |
| 5,208,752 A | * | 5/1993 | Kodama et al. | 701/41 |
| 5,249,639 A | * | 10/1993 | Marr et al. | 180/406 |
| 5,445,239 A | * | 8/1995 | Miller et al. | 180/422 |
| 5,519,614 A | | 5/1996 | Miichi et al. | |
| 5,520,262 A | * | 5/1996 | Marcott | 180/418 |
| 5,937,966 A | * | 8/1999 | Li | 180/432 |
| 6,069,460 A | * | 5/2000 | Grabowski et al. | 318/434 |
| 6,505,701 B2 | * | 1/2003 | Juul et al. | 180/418 |
| 6,575,264 B2 | | 6/2003 | Spadafora | |
| 6,675,904 B2 | * | 1/2004 | Joung | 172/2 |
| 6,769,451 B2 | | 8/2004 | Hjelsand | |

(Continued)

FOREIGN PATENT DOCUMENTS

JP 2004-276663 10/2004

OTHER PUBLICATIONS

Rexroth Bosch Group, presentation titled, "Hydrostatic Steerings," given by Helmut Funk at Mossville, IL, dated 2003 (20 pages).

(Continued)

*Primary Examiner*—Lesley D. Morris
*Assistant Examiner*—Michael R Stabley
(74) *Attorney, Agent, or Firm*—Finnegan, Henderson, Farabow, Garrett & Dunner

(57) ABSTRACT

A hydraulic steering system for a work machine may include a first steering actuator having a first and a second chamber. In addition, the steering system may include a second steering actuator having a third and a fourth chamber. A multi-position directional valve may include at least one low power position and at least one high power position. The low power position may be configured to direct fluid only to the first chamber during a low power turn to extend the first steering actuator. The high power position may be configured to direct fluid to the first chamber and the third chamber during a high power turn to retract the second steering actuator.

26 Claims, 3 Drawing Sheets

U.S. PATENT DOCUMENTS

2004/0060712 A1    4/2004    Charles

OTHER PUBLICATIONS

Eaton Hydraulics, presentation titled "Steer-By-Wire Overview," given at Mossville, IL in 2003 (11 pages).

Sauer Danfoss, presentation titled "Sauer-Danfoss Steering components and applications," given at Mossville, IL in 2000, dated Jul. 5, 2000 (44 pages).

Volvo, Service Manual L220E, Section 5 Brakes (1st ed. publication date unknown) (54 pages).

Volvo, Service Manual L220E, Section 6 Steering (1st ed. publication date unknown) (42 pages).

Volvo, Service Manual L220E, Section 9 Hydraulic system, 9:1 Hydraulic system (1st ed. publication date unknown) (64 pages).

Volvo, Service Manual L220E, Section 9 Hydraulic system, 9:2 Hydraulic diagrams (1st ed. publication date unknown) (21 pages).

Komatsu, WA500-3 Wheel Loader Shop Manual (CEBM001202), Serial Nos. WA500-3LE-A70001 and up (Jan. 1999) (110 pages).

* cited by examiner

- - - - - - LOAD SENSING LINE
— - — - DRAIN LINE
· · · · · · · · PRESSURE PICKUP

ON-DEMAND ELECTRO-HYDRAULIC STEERING SYSTEM

TECHNICAL FIELD

This disclosure is directed generally to an electro-hydraulic steering system and, more particularly, this disclosure is directed to an on-demand electro-hydraulic steering system for a work machine.

BACKGROUND

Earthmoving and construction work machines often employ hydraulic steering systems that control steering functions and operation. These steering systems often provide pressurized fluid to hydraulic actuators arranged to change a steering angle of front or rear wheels to steer the work machine.

On a conventional work machine, a steering system includes two steering actuators that control the steering angle of the wheels. During steering, the system typically extends one actuator while retracting the other. Extending and retracting the actuators often may be accomplished by introducing pressurized fluid into a head end of one actuator and a rod end of the other actuator. Thus, both actuators provide a steering force to change the wheel steering angle and steer the work machine.

One example of a known system that provides conventional steering control is disclosed in U.S. Pat. No. 5,520,262. The system includes a three position directional valve disposed between a pump and a pair of steering cylinders. The valve and fluid lines are arranged to provide fluid to both steering cylinders to implement either a right or left turn. Accordingly, when turning, fluid is fed to the head end of one steering cylinder and the rod end of the other steering cylinder.

While the system disclosed in the '262 patent may be effective for providing steering control, the system may also introduce some inefficiencies. These efficiencies may occur because, in addition to hydraulic steering control, a conventional work machine includes many additional systems and implements requiring hydraulic power. For example, work machines, such as wheel loaders, may include a loading bucket moveable with hydraulic powered actuators. While steering, conventional steering systems may draw fluid away from these additional hydraulically powered systems and implements, thereby reducing the fluid power available to those systems and implements.

In addition, conventional steering control systems may provide more steering force than is necessary, thereby resulting in additional inefficiencies. For example, one or more hydraulic pumps may generate the fluid pressure used for steering. These pumps may be driven by an engine, such as an internal combustion engine. Therefore, operating the pumps to provide more fluid pressure than may be required may increase the load on the engine, and likewise, increase fuel consumption.

Another known hydraulic system that may allow implement control while steering may be configured to provide fluid power to only one of two steering actuators, thereby maintaining fluid and fluid power for operation of the other implements. If the fluid power at the powered actuator is insufficient to properly steer the work machine, the steering system may direct fluid to both actuators. However, the known system is complex, includes many components, and may be difficult to implement. For example, the system does not use a main valve that controls flow to all the chambers. The many components necessary to operate the known steering system may increase production costs and may reduce reliability.

Yet another system that provides fluid power first, to only one of two steering actuators, and then if required, to a second steering actuator is disclosed in U.S. Pat. No. 5,193,637. The '637 patent discloses a system that uses a control valve that connects one chamber of a first steering piston cylinder to a fluid pump. A directional valve is used to direct fluid to a chamber of a second steering piston cylinder when fluid pressure exceeds a given amount. The system disclosed in the '637 patent requires multiple valves in communication with the steering piston cylinders and, therefore, may be overly complex and expensive.

What is needed is a steering system that may be less complex, less expensive, more efficient, and more compact than previous steering systems, yet still may provide desired pressure during steering to additional hydraulic systems and implements. The system disclosed and described herein may overcome one or more of the problems in the prior art.

SUMMARY OF THE INVENTION

In one exemplary aspect, a hydraulic steering system for a work machine is disclosed. The steering system may include a first steering actuator having a first and a second chamber. In addition, the steering system may include a second steering actuator having a third and a fourth chamber. A multi-position directional valve may include at least one low power position and at least one high power position. The low power position may be configured to direct fluid only to the first chamber during a low power turn to extend the first steering actuator. The high power position may be configured to direct fluid to the first chamber and the third chamber during a high power turn to retract the second steering actuator.

In another exemplary aspect, a method of steering a work machine with a hydraulic steering system is disclosed. The method may include providing a first steering actuator having a first and a second chamber, and may include providing a second steering actuator having a third and a fourth chamber. Fluid may be directed through a low power position on a multi-position directional valve to only to the first chamber during a low power turn. Fluid may be directed through a high power position on the multi-position directional valve to the first chamber and the third chamber during a high power turn.

DETAILED DESCRIPTION

Reference will now be made in detail to exemplary embodiments that are illustrated in the accompanying drawings. Wherever possible, the same reference numbers will be used throughout the drawings to refer to the same or like parts. While specific configurations and arrangements are discussed, it should be understood that this is done for illustrative purposes only.

Figure 1:
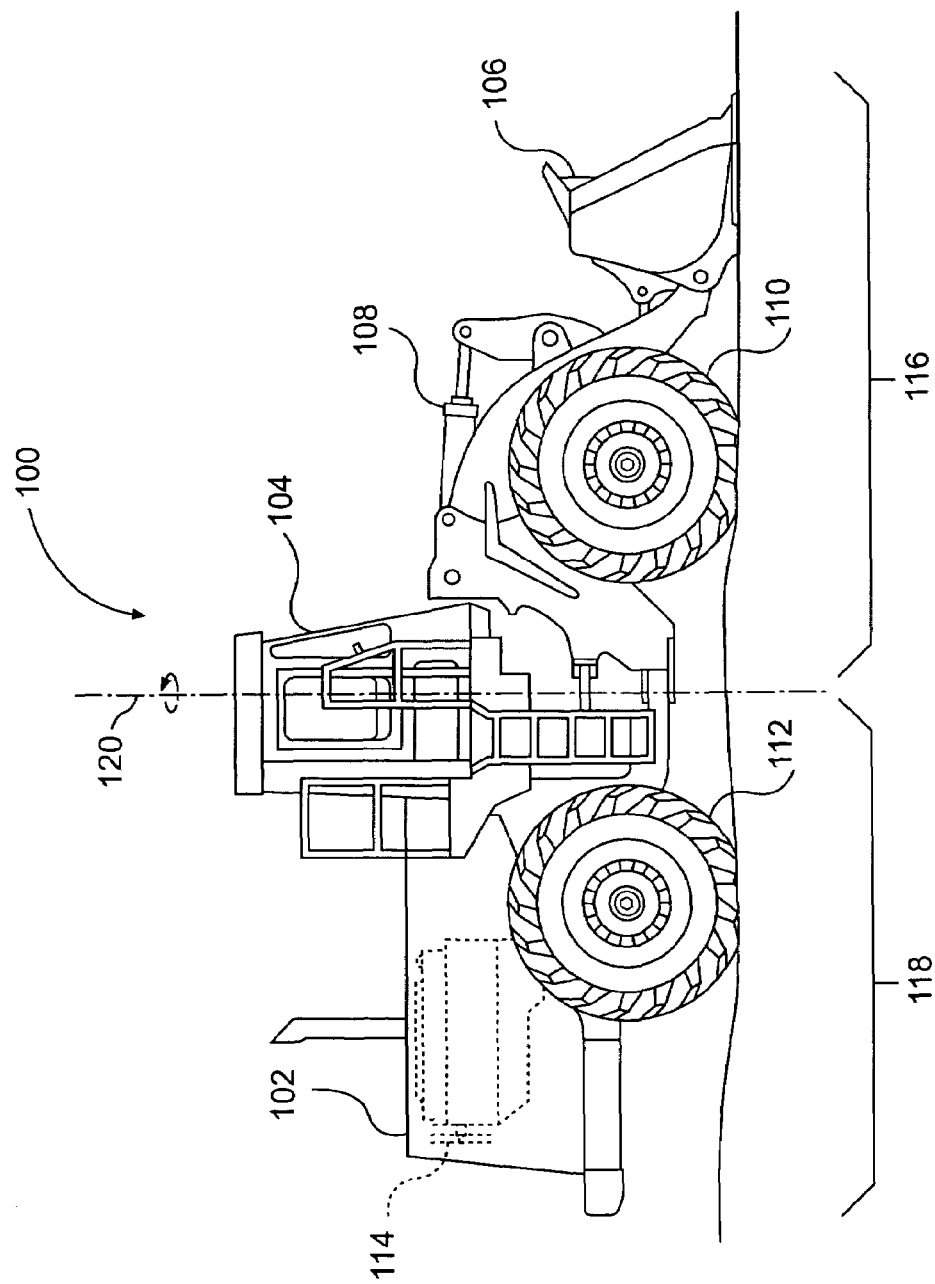
FIG. 1 is a diagrammatic illustration of an exemplary work machine.

FIG. 1 shows an exemplary work machine 100 that may incorporate an electro-hydraulic steering system as disclosed herein. The work machine 100 may include an engine housing 102, an operator station 104, and a work implement 106, such as, for example, a bucket for digging and loading material. In the example of work machine 100 being a wheel loader, the work implement 106 is powered and controlled by a number of actuators, including a tilt actuator 108.

The work machine 100 may include front and rear ground engaging devices, such as front wheels 110 and rear wheels 112 that support the work machine 100. The engine housing 102 may include a power source, such as an engine 114, that may provide power to the front and/or rear wheels 110, 112.

To drive the work machine 100, an operator may manipulate one or more steering input devices that may be housed within the operator station 104. The input devices may ultimately steer the work machine 100 by extending and retracting hydraulic steering actuators (not shown in FIG. 1). In the example of work machine 100 being a wheel loader, the work machine 100 may include a front end 116 and a back end 118. The hydraulic steering actuators may extend between the front and back ends 116, 118 and may be configured to articulate the front end 116 relative to the back end 118 about an articulation axis 120. Although the electro-hydraulic steering system is discussed with reference to an articulating work machine, the principles and system described herein are equally applicable to a more conventional hydraulic steering system that may turn the wheels relative to the work machine body to steer the work machine.

Figure 2:
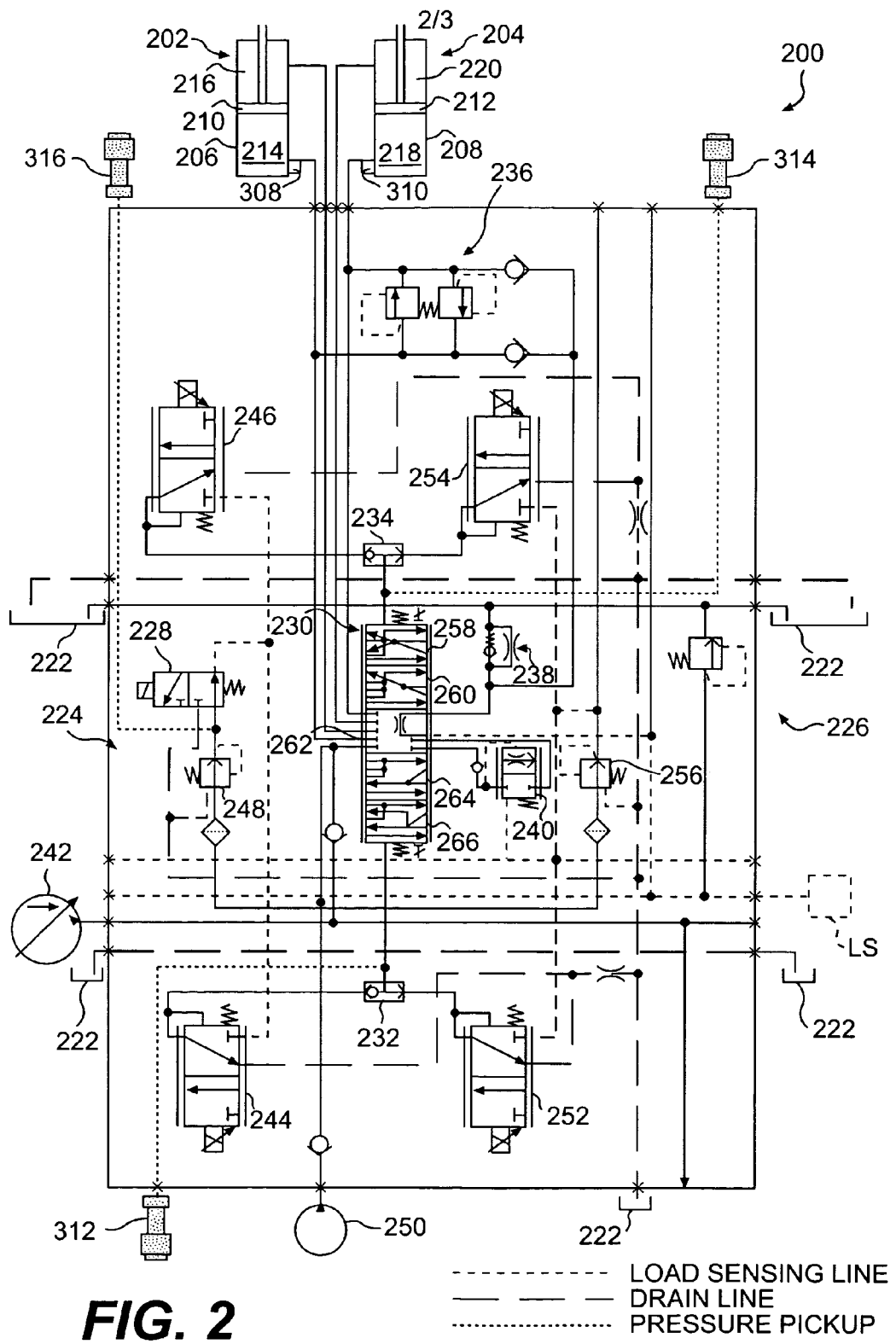
FIG. 2 is a schematic representation of an exemplary electro-hydraulic steering system.

FIG. 2 illustrates an exemplary electro-hydraulic system 200 that may be incorporated on the work machine 100 to provide steering control. The electro-hydraulic system may include first and second steering actuators 202, 204 that provide the steering control. The electro-hydraulic system 200 also may include a plurality of fluid components and electrical components that cooperate together to control the extension and retraction of the steering actuators 202, 204, to thereby steer the work machine 100. For purposes of clarity, the steering actuators will be described first, followed by a description of the fluid components, and then by a description of the electrical components.

The first and second steering actuators 202, 204 may be actuators known in the art, and may be, for example, hydraulic driven cylinders. The first and second steering actuators 202, 204 may include first and second tubes 206, 208, respectively, and first and second piston assemblies 210, 212, respectively. The first piston assembly 210 divides the first tube 206 into a first and a second chamber 214, 216, and the second piston assembly 212 divides the second tube 208 into a third and a fourth chamber 218,220. The chambers 214,216, 218,220 of each steering actuator 202, 204 may be selectively supplied with a pressurized fluid and drained of the pressurized fluid to cause the piston assemblies 210, 212 to displace within the tubes 206, 208, thereby changing the effective length of the steering actuators 202, 204. Because the piston assemblies 210, 212 include a rod at one side, the effective area of the piston assemblies 210, 212 adjacent the first and third chambers 214,218 is greater than the effective area of the piston assemblies 210, 212 adjacent the second and fourth chambers 216, 220.

The expansion and retraction of the steering actuators 202, 204 may function to control the steering of the work machine 100. To provide uniform force for either a right or a left turn, the steering actuators 202, 204 may be configured on the work machine 100 in a manner that extension of one of the steering actuators 202, 204 results in the retraction of the other. In the exemplary embodiment of the articulated wheel loader shown in FIG. 1, the first and second steering actuators 202, 204 may extend between the front and back ends 116, 118 in FIG. 1, with the first actuator 202 being configured to extend to turn the work machine 100 to the right while the second actuator 204 retracts. Similarly, a left turn would require that the second actuator 204 extend while the first actuator 202 retracts. Either the first or second actuators 202, 204 could be arranged to extend to effect either a right or a left turn. Other configurations may also be used, as may be the case on a non-articulating vehicle.

The fluid components may include a tank 222, a primary steering system 224, a redundant steering system 226, an on-off valve 228, a main valve 230, and right and left shuttle valves 232, 234. In addition, the fluid components may include additional features, including, for example, cross-over relief and make-up valves 236, one or more back pressure valves 238, and a pressure compensator valve 240. It is contemplated that electro-hydraulic system 200 may include additional and/or different components than those shown such as, for example, accumulators, restrictive orifices, check valves, pressure relief valves, makeup valves, pressure-balancing passageways, and other components known in the art. It is contemplated that other components may also be utilized in the system to customize the system according to specific needs.

The tank 222 may constitute a reservoir configured to hold a supply of fluid, such as, for example, a dedicated hydraulic oil, an engine lubrication oil, a transmission lubrication oil, or any other fluid known in the art. Besides the electro-hydraulic system 200, one or more additional hydraulic systems within the work machine 100 may draw fluid from and return fluid to the tank 222. It is also contemplated that the electro-hydraulic system 200 may be connected to multiple separate fluid tanks.

The primary and redundant steering systems 224, 226 may be configured to provide fluid from the tank 222 to the main valve 230. The primary steering system 224 may include a fluid source such as a first fluid source 242 and/or a second fluid source 250, a right primary steering pilot valve 244, a left primary steering pilot valve 246, and a primary pressure reducing valve 248. Similarly, the redundant steering system 226 may include a fluid source such as at least one of the first or second fluid sources 242, 250, a right redundant steering pilot valve 252, a left redundant steering pilot valve 254, and a redundant pressure reducing valve 256.

The first and second fluid sources 242, 250 may be configured to each draw fluid from the tank 222 and produce a flow of pressurized fluid to the steering pilot valves 244, 246, 252, 254, the main valve 230, and the steering actuators 202, 204. The first and second fluid sources 242, 250 may each constitute, for example, a variable displacement pump, a fixed displacement pump, a variable delivery pump, or any other pressurizing system known in the art. The first and second fluid sources 242, 250 may be drivably connected to a power source, such as the engine 114 in FIG. 1, by for example, a countershaft (not shown), a belt (not shown), an electrical circuit (not shown), or in any other suitable manner. Alternatively, the first fluid source 242 may be indirectly connected to the power source, such as the engine 114, via a torque converter, a gear box, or in any other appropriate manner. The second fluid source 250 may be ground driven through a transmission transfer gear, and may be a secondary steering pump. It is contemplated that multiple sources of pressurized fluid may be interconnected to supply pressurized fluid to electro-hydraulic system 200.

The right and left primary steering pilot valves 244, 246 and the right and left redundant steering pilot valves 252, 254 may be 3-way, 2-position proportional solenoid reducing valves in fluid communication with the first and second fluid sources 242, 250. The steering pilot valves 244, 246, 252, 254 may be independently controlled and configured to direct pilot fluid to the main valve 230. In so doing, the pilot fluid from the steering pilot valves 244, 246, 252, 254 may affect the amount of fluid flow through the main valve 230, thereby ultimately controlling the rate and direction of extension of the first and second steering actuators 202, 204. In one exemplary embodiment, the right and left primary steering pilot valves 244, 246 comprise the two separate valves as shown in FIG. 2. In another exemplary embodiment, the right and left primary steering pilot valves 244, 246 may comprise a single valve, such as, for example, a 4-way, 3-position valve. Likewise, the right and left redundant steering pilot valves 252, 254 also may comprise two separate valves as shown, or a single valve. Other valve configurations for the valves 244, 246, 252, and 254 also would be apparent to one skilled in the art.

The primary pressure reducing valve 248 and the redundant pressure reducing valve 256 are operable in a known manner and are configured to reduce the fluid pressure fed from the first and second fluid sources 242, 250 to the respective primary and redundant steering pilot valves 244, 246, 252, 254.

The on-off valve 228 may be a solenoid operated valve operable to control fluid flow to the primary system. In the exemplary embodiment shown, the on-off valve 228 is disposed between the primary pressure reducing valve 248 and the left and right primary valves 244, 246. When the on-off valve 228 is OFF, fluid may be allowed to flow to the left and right primary steering pilot valves 244, 246, and when the on-off valve 228 is ON, fluid may not be allowed to flow to the primary steering pilot valves 244, 246. Accordingly, when the on-off valve 228 is ON, the primary steering system 224 may not be capable of controlling the position of the main valve 230 and, therefore, may not control the steering of the work machine 100.

The main valve 230 may be in fluid communication with the first and second fluid sources 242, 250 and may be configured to regulate the amount of fluid passed to the steering actuators 202, 204 to effect actuation and any desired steering adjustment. In addition, the main valve 230 may be a pilot operated valve in fluid communication with the primary and redundant steering pilot valves 244, 246, 252, 254. Accordingly, pilot fluid from the steering pilot valves 244, 246, 252, 254 may directly affect the position of the main valve 230, which directly affects the amount of fluid allowed to flow to the steering actuators 202, 204. In the example shown, the main valve 230 is a 9-way, 5-position pilot operated directional spool valve operable to control the flow of pressurized fluid to each of the steering actuators 202, 204. Based upon the five positions, fluid is directed to the steering actuators 202, 204 at different directions and rates, thereby providing the steering control. In addition to being a spool valve, in other exemplary embodiments, the main valve 230 may be a rotary valve or other type of multi-position valve.

In the exemplary embodiment shown, the five positions include a left high power position 258, a left low power position 260, a no-flow position 262, a right low power position 264, and a right high power position 266. The left high power position 258 is configured to direct fluid flow to the second and third chambers 216, 218 of the first and second actuators 202, 204, while the first and fourth chambers 214, 220 are allowed to drain to the tank 222. The left low power position 260 may be configured to direct fluid flow to only the third chamber 218, while the first, second, and fourth chambers 214, 216, 220 are allowed to drain to the tank 222. The no-flow position 262 may be configured to effectively block flow to both steering actuators 202, 204. The right low power position 264 is configured to direct fluid flow to the first chamber 214, while the second, third, and fourth chambers 216, 218, 220 are open to the tank 222. The right high power position 266 is configured to direct fluid flow to the first and fourth chambers 214, 220, while the second and third chambers 216, 218 are open to the tank 222. Springs at each end of the main valve 230 bias the main valve 230 to the no-flow position 262.

The right shuttle valve 232 is operable to selectively direct fluid flow from one of the right primary steering pilot valve 244 and the right redundant steering pilot valve 252 to the main valve 230 to shift the position of the main valve 230. Likewise, the left shuttle valve 234 is operable to selectively direct fluid flow from one of the left primary steering pilot valve 246 and the left redundant steering pilot valve 254 to the main valve 230 to shift the position of the main valve 230. Therefore, the shuttle valves 232, 234 may be operable to selectively direct fluid from one of the primary and the redundant steering systems 224, 226 to control the position of the main valve 230 and thereby control the amount of fluid from the main valve 230 to the steering actuators 202, 204.

The cross-over relief and make-up valves 236 may be associated with the fluid lines between the main valve 230 and the steering actuators 202, 204. The cross-over relief and make-up valves 236 may provide shock relief in a manner known in the art. The cross-over relief and make-up valves 236 may include two types of valves, with the cross-over relief valves being configured to absorb pressure spikes and the make-up valves being configured to prevent the steering cylinder from voiding by providing oil flow and pressure from the return line to steering cylinder. The back-pressure valve 238 may be disposed in a return line from the steering actuators 202, 204 and may be configured to maintain a level of pressure in the steering actuators 202, 204 to enhance responsiveness. The pressure compensator valve 240 may be an optional valve that may be included when the fluid pressure from the first and second fluid sources 242, 250 is used to provide fluid power management to additional components on the work machine 100. Accordingly, in one exemplary embodiment, when the electro-hydraulic steering system 200 is combined with a second circuit, then the pressure compensator valve 240 may help to provide a flow sharing feature that will be used as back-up to provide electronic priority or hydro-mechanical priority to the steering system 200 over the second circuit. The pressure compensator valve 240 may be configured to ensure that although fluid may be used to control other components, a sufficient amount of fluid is always available for the electro-hydraulic steering system 200.

Figure 3:
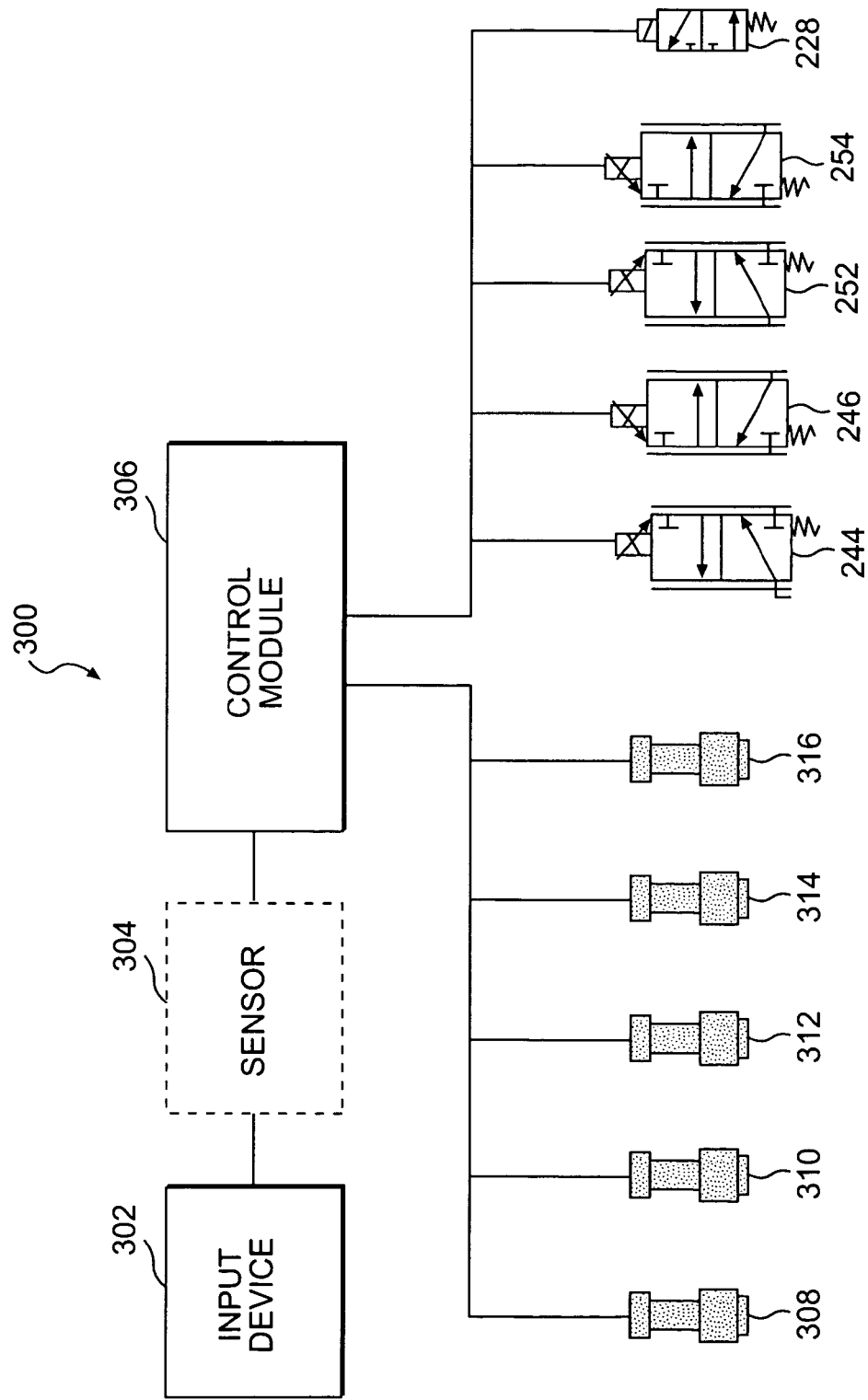
FIG. 3 is a schematic representation of an exemplary electrical control system for the electro-hydraulic steering system in FIG. 2.

The electrical components of the electro-hydraulic system 200 are described with reference to FIGS. 2 and 3. The electrical components may form a control system 300 that may include pressure sensors (shown in FIGS. 2 and 3), an input device 302, an input sensor 304, and a control module 306 (all shown in FIG. 3). The pressure sensors may be associated with the fluid lines between components or with the components themselves and may monitor fluid pressures within the electro-hydraulic system 200. In this embodiment, the pressure sensors may include a first pressure sensor 308 and a second pressure sensor 310 associated with the first and second actuators 202, 204, respectively. Additional pressure sensors may include a right pressure sensor 312, a left pressure sensor 314, and a main line pressure sensor 316. In the exemplary embodiment shown, the first and second pressure sensors 308, 310 may each be configured to respectively monitor the pressure associated with the first chamber 214 of the first actuator 202 and the third chamber 218 of the second actuator 204. In one exemplary embodiment, the first and second pressure sensors 308,310 may be disposed within a head portion of the steering actuators 202, 204. However, the first and second pressure sensors 308, 310 instead may be disposed to monitor the pressure in the fluid lines between the first and third chambers 214,218 and the main valve 230.

Although the electro-hydraulic system 200 employs pressure sensors 308, 310 to measure the fluid pressure, the sensors could be any sensors configured to monitor parameters indicative of resistance to actuation of the first and second actuators 202, 204. Resistance to actuation may be an indication of resistance to turning at the wheels 110, 112 of the work machine 100. In one exemplary embodiment, resistance to actuation may be detected by monitoring the articulation rate of the work machine or of the wheels by sensors. The detected rate then may be compared to rate values stored in the control module 306. In another exemplary embodiment, the resistance to actuation may be based on a monitored velocity or position. Again, the monitored velocity or position may be compared to threshold velocities or positions stored within the control module 306. As used herein, the term "detecting resistance to steering actuation" may be inclusive of any parameter that may be monitored to detect resistance to a turn.

In use, an output from any of the pressure sensors 308, 310, 312, 314, 316 (or any sensor that detects resistance to actuation) may be communicated as an input to the control module 306, which in response, may increase current (the command) to the relevant proportional solenoid steering pilot valves 244, 246, 252, 254. In turn, this may increase the pilot signal to one side of the main valve 230, thereby further shifting the main valve 230 to either the left or right high power positions 258, 266. In one exemplary embodiment, the pressure sensors 308, 310 may be replaced by a single optional pressure sensor (labeled LS in FIG. 2) that may be installed in communication with the main valve 230 and may measure only the load sensing signal. This would allow proper operation while employing fewer sensors than in the exemplary embodiment shown.

As shown in FIG. 2, the right and left pressure sensors 312, 314 may be disposed in a manner to monitor pressure between the main valve 230 and the respective right and left shuttle valves 232, 234. By monitoring the fluid pressure between the shuttle valves 232, 234 and the main valve 230, the right and left pressure sensors 312, 314 may detect the pilot force being applied to shift the main valve 230 to control the steering on the work machine 100. The main line pressure sensor 316 may be configured to monitor the fluid pressure being fed to the right and left primary steering pilot valves 244, 246. In the exemplary embodiment shown in FIG. 2, the main line pressure sensor 316 is disposed between the primary pressure reducing valve 248 and the on-off valve 228. The pressure sensors 312, 314, 316 may be disposed at other locations about the electro-hydraulic system 200 to provide desired data about the system's operating condition.

The input device 302 could be a rotary device such as a steering wheel, linear device such as a joystick, or other input device known in the art, and may be disposed within the operator station 104 for manipulation by a work machine operator. Configured to generate a desired movement signal, the input device 302 sends input to the control module 306 as an electrical steering signal. For example, in the exemplary embodiment where the input device 302 is a steering wheel, an operator may turn the steering wheel to generate a steering signal as a command to operate the electro-hydraulic system 200 to effect the desired turn. An optional sensor 304, such as a transducer, may be associated with the input device 302 and may be used to detect manipulation of the input device 302. Thus, the sensor 304 may generate the steering signal.

The control module 306 may include a processor and memory. The memory may store one or more routines executable by the processor, which could be software programs, for controlling the electro-hydraulic system 200. In addition, the memory may store pre-established threshold values used to determine when resistance to a turn is excessive. The control module 306 may use the stored threshold values to distinguish when turning the work machine may be satisfactorily accomplished with a low power turn and when turning the work machine may be more satisfactorily accomplished with a high power turn.

The control module 306 may be operable to receive data indicative of a desired steering direction from the input device 302 or sensor 304 and indicative of fluid pressure from one or more of the pressure sensors 308, 310, 312,314, 316. Based upon the data received, the control module 306 may control any of the solenoid actuated valves of the electro-hydraulic system 200, such as the steering pilot valves 244, 246, 252, 254 and the on-off solenoid valve 228. The control module 306 may be configured to generate a control signal based on the input signal from the input device 302 and control the solenoid actuated valves 244, 246, 252, 254, 228 to provide an appropriate signal to affect the main valve 230, thereby controlling the steering of the work machine 100.

In one exemplary embodiment, the control module 306 may be configured to control the steering pilot valves to provide pilot pressure to move the main valve 230 to one of the five steering positions 258, 260, 262, 264, 266. For example, upon receipt of a steering signal from the input device 302, the control module 306 may operate the steering pilot valves to provide pilot fluid to position the main valve 230 to the left low power position 260. If the pressure in the third chamber 218, as detected by the second pressure sensor 310, increases beyond a pre-established amount, the control module 306 may further operate the steering pilot valves to provide pilot fluid to position the main valve 230 at the left high power position 258. By shifting the main valve 230, the additional power is used to provide turning force at the steering actuators 202, 204.

In one alternative embodiment, the electro-hydraulic steering system 200 may be configured in a manner to direct the fluid to the second and fourth chambers in the low power positions, rather than the first and third chambers. In such an embodiment, the electro-hydraulic system may collect data indicative of resistance to a turn by, for example, monitoring the pressure at the second and fourth chambers. As explained above, other methods may be used to monitor resistance to a turn.

INDUSTRIAL APPLICABILITY

The electro-hydraulic steering system 200 described herein may reduce the amount of pressurized fluid used to steer the work machine 100 during many operating scenarios, thereby increasing the amount of pressurized fluid that is available, while steering, for the operation of other, non-steering systems and implements. This may enable the work machine 100 to operate the non-steering systems and implements during a turn with a minimized pressure loss, thereby enhancing responsiveness and control of the non-steering implements. Accordingly, the work machine 100 may be able to operate more efficiently as it continues to perform other functions at satisfactory rates. In addition, because the work machine 100 may be capable of providing satisfactory fluid power management to both the steering system and the non-steering systems, the engine 114 and other components that drive the fluid sources 242, 250, may be operated at lower speeds while still providing the same work or energy. This may reduce fuel costs, resulting in efficiencies in fuel consumption.

In addition, the electro-hydraulic system 200 described herein may be cost-effective by providing control through a main valve, such as the main valve 230, as opposed to multiple valves. Combining functions of multiple valves into a main valve may provide efficient use of space on the work machine 100 and may reduce overall manufacturing costs.

The electro-hydraulic steering system 200 may operate by supplying a first amount of pressurized fluid to the steering actuators 202, 204 during a turn. If the steering is not as responsive as desired, a second amount of pressurized fluid may be directed to the steering actuators 202, 204 to provide additional steering power. Accordingly, steering operates at low power unless low power is not sufficient, then the steering operates at high power. One exemplary description of a steering method is described below.

An operator may desire to implement a turn on the work machine 100 by manipulating the input device 302. The input device 302 may send a steering signal to the control module 306 or, alternatively, the sensor 304 may send a steering signal to the control module 306 indicative of the operator's desire. The control module 306 may receive the steering signal and generate a steering command signal.

The steering signal may be an instructive signal to open one of the solenoid driven steering pilot valves 244, 246, 252, 254 a desired amount. The steering command signal may be communicated to the appropriate steering pilot valve 244, 246, 252, 254, and the steering pilot valve may operate to provide pilot fluid that controls the position of the main valve 230. Initially, the steering pilot valves 244, 246, 252, 254 may provide pilot fluid to move the main valve 230 to a low power position, such as the right or left low power positions 260, 264. At the low power position, fluid may be directed to one of the four chambers 214, 216, 218, 220 in the steering actuators 202, 204, while the other three chambers are open to the tank.

During this time, the draw of pressurized fluid is limited to one of the four chambers 214, 216, 218, 220 of the steering actuators 202, 204, providing the remainder of the pressurized fluid for operation of other, non-steering implements on the work machine 100. For example, even though the steering system is drawing fluid to execute a turn, the work implement 106 may be controlled with minimal loss of fluid power.

As the piston assemblies 210, 212 within the steering actuators 202, 204 move in response to the low power fluid, the pressure sensors 308, 310 monitor fluid pressure at the chamber being filled and communicate signals indicative of the monitored fluid pressures to the control module 306. The control module 306 may have stored therein a series of pre-established threshold pressure values for each input from the input device 302. If the monitored pressure is above the pre-established threshold value, then the control module 306 may determine that the steering system is encountering resistance to the turn. Resistance could be caused by a number of exterior factors, including the type of terrain being traversed, such as sand or rock, the wetness of the ground, such as muddy or dry, and other environmental factors.

If the control module 306 determines that the fluid is above the threshold value, then the control module 306 may increase the turning power of the steering system. This may be accomplished when the control module 306 sends a revised steering command signal to the appropriate steering pilot valve to further open the steering pilot valve to increase the pilot fluid pressure. In response to the increased pilot pressure, the main valve 320 may shift positions from the left or right low power position 260, 264 to the left or right high power position 258, 266. Doing so provides pressurized fluid flow to two chambers of the steering actuators 202, 204 instead of one. Accordingly, the steering system provides higher forces, thereby ensuring that the steering system is sufficiently responsive.

In one exemplary embodiment, once the fluid pressure, as detected by the first or second pressure sensors 308, 310 falls below the threshold value, the control module 306 may change the control signal to the steering pilot valve to reduce the pilot pressure at the main valve 230, thereby allowing the main valve 230 to again be positioned at the low power position.

Although the electro-hydraulic steering system 200 is discussed with reference to an articulating work machine, the principles and system described herein are equally applicable to a more conventional hydraulic steering system that may turn the wheels relative to the work machine body to steer the work machine.

It will be apparent to those skilled in the art that various modifications and variations can be made in the disclosed embodiments without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A hydraulic steering system for a machine, comprising:
   a first steering actuator having a first and a second chamber;
   a second steering actuator having a third and a fourth chamber; and
   a multi-position directional valve having at least one low power position and at least one high power position, the low power position being configured to direct fluid only to the first chamber during a low power turn to extend the first steering actuator, and the high power position being configured to direct fluid to the first chamber and the fourth chamber during high power turn to retract the second steering actuator.

2. The hydraulic steering system of claim 1, including a control module configured to shift the multi-position directional valve between the low power position and the high power position.

3. The hydraulic steering system of claim 2, including at least one steering pilot valve in electrical communication with the control module, the at least one steering pilot valve being configured to direct pilot fluid to the multi-position directional valve to affect the position of the multi-position directional valve based upon a signal from the control module, the control module being configured to shift the multi-position directional valve from the low power position to the high power position by controlling the at least one steering pilot valve.

4. The hydraulic steering system of claim 2, including a sensor in communication with the control module, the sensor being configured to monitor resistance to a turn.

5. The hydraulic steering system of claim 4, wherein the sensor is a pressure sensor.

6. The hydraulic steering system of claim 4, wherein the control module is configured to receive a data signal from the sensor indicative of the monitored resistance, the control module being configured to compare data indicative of the monitored resistance with a threshold value and control the multi-position directional valve to shift the multi-position directional valve from the low power position to the high power position when the monitored resistance exceeds the threshold value.

7. The hydraulic steering system of claim 1, including a tank, wherein the multi-position directional valve is configured to direct fluid to the tank from the second, third, and fourth chambers during the low power turn.

8. The hydraulic steering system of claim 1, including:
a primary fluid source; and
a redundant fluid source, the primary and redundant fluid sources being operable to selectively provide fluid to the first and second actuators and to provide pilot fluid to the multi-position directional valve.

9. The hydraulic steering system of claim 1, wherein each of the primary and redundant steering systems include a right steering pilot valve, a left steering pilot valve, and a fluid source.

10. The hydraulic steering system of claim 1, wherein the multi-position directional valve is configured to direct fluid to extend the first actuator and retract the second actuator.

11. The hydraulic steering system of claim 3, wherein the at least one steering pilot valve is a solenoid operated valve, and wherein the control module is configured to send an electrical signal to activate the solenoid.

12. The hydraulic steering system of claim 1, wherein the hydraulic steering system is associated with an articulated wheel loader.

13. A method of steering a machine with a hydraulic steering system, comprising:
providing a first steering actuator having a first and a second chamber;
providing a second steering actuator having a third and a fourth chamber;
directing fluid through a low power position on a multi-position directional valve to only to the first chamber during a low power turn; and
directing fluid through a high power position on the multi-position directional valve to the first chamber and the third chamber during a high power turn.

14. The method of claim 13, including shifting the multi-position directional valve between the low power position and the high power position with a control module.

15. The method of claim 14, wherein shifting the multi-position directional valve with a control module includes directing pilot fluid from a steering pilot valve to the multi-position directional valve based upon a signal from the control module.

16. The method of claim 14, including monitoring resistance to a turn with a sensor.

17. The method of claim 16, wherein monitoring resistance to a turn includes monitoring pressure in at least one of the first and second actuators with a pressure sensor.

18. The method of claim 16, including:
receiving a data signal from the sensor at the control module, the data signal being indicative of the monitored resistance,
comparing data indicative of the monitored resistance with a stored threshold value; and
shifting the multi-position directional valve from the low power position to the high power position when the monitored resistance exceeds the threshold value.

19. A machine, including:
a hydraulic steering system, the system including:
a main valve;
a pilot valve configured to direct pilot fluid to the main valve in response to a first control signal, the main valve configured to open to a first position in response to the pilot fluid;
a first steering actuator configured to receive fluid from the main valve;
a second steering actuator configured to receive fluid from the main valve;
a sensor configured to detect resistance to actuation of the first steering actuator; and
a control module configured to compare the detected resistance to a threshold resistance and send a second control signal to the pilot valve when the detected resistance exceeds the threshold resistance, the pilot valve being configured to direct pilot fluid to the main valve in response to the second control signal, the main valve configured to open to a second position in response to the pilot fluid and direct fluid through the main valve to both the first steering actuator and the second steering actuator.

20. The machine of claim 19, including an input device configured to generate a steering signal, the first and second control signals being sent in response to the steering signal.

21. The machine of claim 19, wherein the sensor is configured to detect resistance to actuation by one of monitoring a fluid pressure and monitoring a turn rate of a steering component.

22. The machine of claim 19, wherein the main valve is a multi-position directional valve.

23. The machine of claim 22, wherein the multi-position directional valve is a nine-way, five-position pilot operated directional spool valve.

24. The machine of claim 22, wherein the multi-position directional valve is configured to direct fluid to extend the first steering actuator and retract the second steering actuator.

25. The machine of claim 19, wherein the at least one steering pilot valve is a solenoid operated valve, and wherein the control module is configured to send an electrical signal to activate the solenoid.

26. The machine of claim 19, wherein the machine is an articulated wheel loader.

\* \* \* \* \*